United States Patent
Ho et al.

(10) Patent No.: US 9,608,473 B2
(45) Date of Patent: Mar. 28, 2017

(54) NEAR FIELD COMMUNICATION AND WIRELESS CHARGING DEVICE AND SWITCHING METHOD USING THE SAME

(71) Applicant: HTC Corporation, Taoyuan County (TW)

(72) Inventors: Chien-TIng Ho, Taoyuan County (TW); Chien-Chih Chen, Taoyuan County (TW); Keng-Chih Lin, Taoyuan County (TW); Yen-Liang Kuo, Taoyuan County (TW); Chih-Jen Hu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 262 days.

(21) Appl. No.: 14/324,247

(22) Filed: Jul. 7, 2014

(65) Prior Publication Data

US 2016/0006290 A1     Jan. 7, 2016

(51) Int. Cl.
*H02J 7/00*     (2006.01)
*H01F 27/42*     (2006.01)
(Continued)

(52) U.S. Cl.
CPC ............ *H02J 7/025* (2013.01); *H02J 7/0044* (2013.01); *H02J 50/12* (2016.02); *H02J 50/80* (2016.02);
(Continued)

(58) Field of Classification Search
CPC ....................................................... H02J 7/025
(Continued)

(56) References Cited

U.S. PATENT DOCUMENTS

2007/0091004 A1*  4/2007  Puuri .................... H01Q 13/10
                                                                                                                         343/718
2010/0112964 A1    5/2010   Yi
(Continued)

FOREIGN PATENT DOCUMENTS

CN         102158236 A     8/2011
CN         102301558 A    12/2011
(Continued)

OTHER PUBLICATIONS

Corresponding German office action that these art references were cited on May 5, 2015.
(Continued)

*Primary Examiner* — Richard Isla Rodas
*Assistant Examiner* — David V Henze-Gongola
(74) *Attorney, Agent, or Firm* — CKC & Partners Co., Ltd.

(57) ABSTRACT

A near field communication and wireless charging device includes a coil, a tuning module, a near field communication module, a wireless charging module, and a power storage device. The coil is configured to receive electromagnetic waves. The tuning module is electrically connected to the coil. The near field communication module includes an attenuator and a near field communication control circuit. The attenuator is configured to attenuate the energy of electromagnetic waves transmitted from the tuning module. The near field communication control circuit is electrically connected to the attenuator. The power storage device is electrically connected to the wireless charging module. Electromagnetic waves are magnetically coupling to the coil, and the coil transmits signals of the electromagnetic waves to the near field communication module through the tuning module, or transmits the energy of the electromag-
(Continued)

netic waves to the power storage device through the tuning module and the wireless charging module.

20 Claims, 8 Drawing Sheets

(51) Int. Cl.
    *H01F 37/00*     (2006.01)
    *H01F 38/00*     (2006.01)
    *H02J 7/02*     (2016.01)
    *H04B 5/00*     (2006.01)

(52) U.S. Cl.
    CPC ......... *H04B 5/0031* (2013.01); *H04B 5/0037* (2013.01); *H04B 5/0075* (2013.01)

(58) Field of Classification Search
    USPC .......................................................... 320/108
    See application file for complete search history.

(56) References Cited

U.S. PATENT DOCUMENTS

| | | | | |
|---|---|---|---|---|
| 2010/0201311 | A1* | 8/2010 | Lyell Kirby | A61L 2/02 320/108 |
| 2010/0279606 | A1* | 11/2010 | Hillan | H04B 5/00 455/41.1 |
| 2011/0156640 | A1* | 6/2011 | Moshfeghi | H02J 7/025 320/108 |
| 2012/0292993 | A1* | 11/2012 | Mettler | H02J 7/0055 307/25 |
| 2013/0217326 | A1* | 8/2013 | Symons | H02J 7/025 455/41.1 |
| 2013/0234658 | A1 | 9/2013 | Endo et al. | |

FOREIGN PATENT DOCUMENTS

| | | | |
|---|---|---|---|
| CN | 202260588 U | 5/2012 | |
| CN | 202444300 U | 9/2012 | |
| CN | 102780515 A | 11/2012 | |
| CN | 203192017 U | 9/2013 | |
| CN | 103516386 A | 1/2014 | |
| CN | 103855472 A | 6/2014 | |
| DE | 102006037668 A1 | 3/2007 | |
| DE | 102011055809 A1 | 5/2013 | |
| JP | 2014-079091 A | 5/2014 | |
| JP | 2014079091 A | * | 5/2014 |
| JP | 2014079091 A | * | 5/2014 |
| TW | M397609 U | 2/2011 | |

OTHER PUBLICATIONS

Corresponding Taiwanese Office Action that these art references were cited on Oct. 22, 2015.
Corresponding Taiwan Office Action that this art reference was first cited on Jun. 4, 2016.

* cited by examiner

NEAR FIELD COMMUNICATION AND WIRELESS CHARGING DEVICE AND SWITCHING METHOD USING THE SAME

BACKGROUND

Field of Invention

The present invention relates to a near field communication and wireless charging device.

Description of Related Art

With the development of wireless transmission technology, more and more portable (for example, handheld or wearable) electronic products have wireless transmission functions. Replacing the connecting wires, the wireless transmission technology enables the electronic products to transmit signal or energy with transmission sources without physically connected but through antennas which transceives electromagnetic waves.

Among the wireless transmission technology, the wireless charging technology and the near field communication technology currently are major trends, and both of them basically need antennas to transceives electromagnetic waves. The wireless charging technology receives electromagnetic waves to charge devices, and the near field communication technology transceives signals through coupling electromagnetic waves. Although the wireless transmission technology facilitates the operation, too many wireless transmission modules and accompanying antennas complicate the assembly of the portable electronic products. It may not only make the miniaturization of the portable electronic products even harder, but may lower their performance.

SUMMARY

An aspect of the present invention is to provide a near field communication and wireless charging device including a coil, a tuning module, a near field communication module, a wireless charging module, and a power storage device. The coil is configured to receive electromagnetic waves. The tuning module is electrically connected to the coil. The near field communication module includes an attenuator and a near field communication control circuit. The attenuator is configured to attenuate the energy of the electromagnetic waves transmitted from the tuning module. The near field communication control circuit is electrically connected to the attenuator. The power storage device is electrically connected to the wireless charging module. The electromagnetic waves are capable of magnetically coupling to the coil, such that the coil transmits signals of the electromagnetic waves to the near field communication module through the tuning module, or transmits the energy of the electromagnetic waves to the power storage device through the tuning module and the wireless charging module.

In one or more embodiments, the wireless charging module includes a rectifier and a power management integrated circuit. The rectifier is configured to rectify the electromagnetic waves into a direct current. The power management integrated circuit is configured to transmit the direct current to the power storage device and manage power transfer of the power storage device.

In one or more embodiments, the wireless charging module further includes a switch electrically connected to the rectifier and the power management integrated circuit. The switch has a power threshold. When a power of the direct current is higher than the power threshold, the rectifier and the power management integrated circuit are electrically connected, and when the power of the direct current is lower than the power threshold, the switch is open.

In one or more embodiments, the switch is a single pole single throw switch.

In one or more embodiments, the wireless charging module further includes a voltage converter configured to adjust a voltage of the direct current.

In one or more embodiments, the wireless charging module further includes a transmitting transceiver electrically connected to the voltage converter and configured to communicate with a transmission source to decide whether to actuate the voltage converter according to a transmission result with the transmission source.

In one or more embodiments, the wireless charging module includes a matching circuit configured to match the impedance between the coil and a transmission source.

In one or more embodiments, the near field communication module further includes a matching circuit configured to match the impedance between the coil and a transmission source.

In one or more embodiments, the near field communication and wireless charging device further includes a switch electrically connected to the tunable module, the near field communication module, and the wireless charging module.

In one or more embodiments, the near field communication and wireless charging device further includes a frequency detector and a control unit. The frequency detector is electrically connected to the switch and is configured to detect an operation frequency of the electromagnetic waves. The control unit is electrically connected to the frequency detector and the switch and is configured to receive the operation frequency detected by the frequency detector. The control unit controls the switch to interconnect the tuning module and the near field communication module or interconnect the tuning module and the wireless charging module according the operation frequency.

In one or more embodiments, the tuning module includes a first tuning element and a second tuning element. The first tuning element is electrically connected to the near field communication module and the coil. The second tuning element is electrically connected to the wireless charging module and the coil. The capacitance of the first tuning element is smaller than the capacitance of the second tuning element.

In one or more embodiments, the tuning module is tunable capacitor.

In one or more embodiments, the coil defines a through hole by a looped configuration. The near field communication module, the wireless charging module, and the power storage device form a metal area disposed in the through hole.

In one or more embodiments, the cross-sectional area of the through hole changes along the axis of the through hole.

In one or more embodiments, the near field communication and wireless charging device further includes a first shielding layer disposed between the metal area and the coil.

In one or more embodiments, the near field communication and wireless charging device further includes a housing disposed around the coil.

In one or more embodiments, when the housing is made by conductive material, the near field communication and wireless charging device further includes a second shielding layer disposed between the housing and the coil.

In one or more embodiments, the first shielding layer is configured to be a carrier of the coil.

In one or more embodiments, the housing is configured to be a carrier of the coil.

In one or more embodiments, the second shielding layer is configured to be a carrier of the coil.

In one or more embodiments, the near field communication and wireless charging device further includes a wearable structure configured to allow a user to wear the near field communication and wireless charging device. The coil is disposed at the surface of a body of the near field communication and wireless charging device away from the user.

Another aspect of the present invention is to provide a switch method of near field communication and wireless charging including detecting the operation frequency of electromagnetic waves received by a coil. A near field communication mode or a wireless charging mode is selected to proceed according to the operating frequency. If the near field communication mode is selected, the energy of the electromagnetic waves is attenuated and then information of the electromagnetic waves is processed. If the wireless charging mode is selected, the energy of the electromagnetic waves is transmitted to a power storage device.

In one or more embodiments, selecting the near field communication mode includes processing a transmission confirmation with a transmission source. If the transmission confirmation is positive, processing signals of the electromagnetic waves; if the transmission confirmation is negative, stopping processing the signals of the electromagnetic waves.

In one or more embodiments, selecting the wireless charging mode includes processing a transmission confirmation with a transmission source. If the transmission confirmation is positive, transmitting the energy of the electromagnetic waves to the power storage device; if the transmission confirmation is negative, stopping transmitting the energy of the electromagnetic waves to the power storage device.

DETAILED DESCRIPTION

Figure 1:
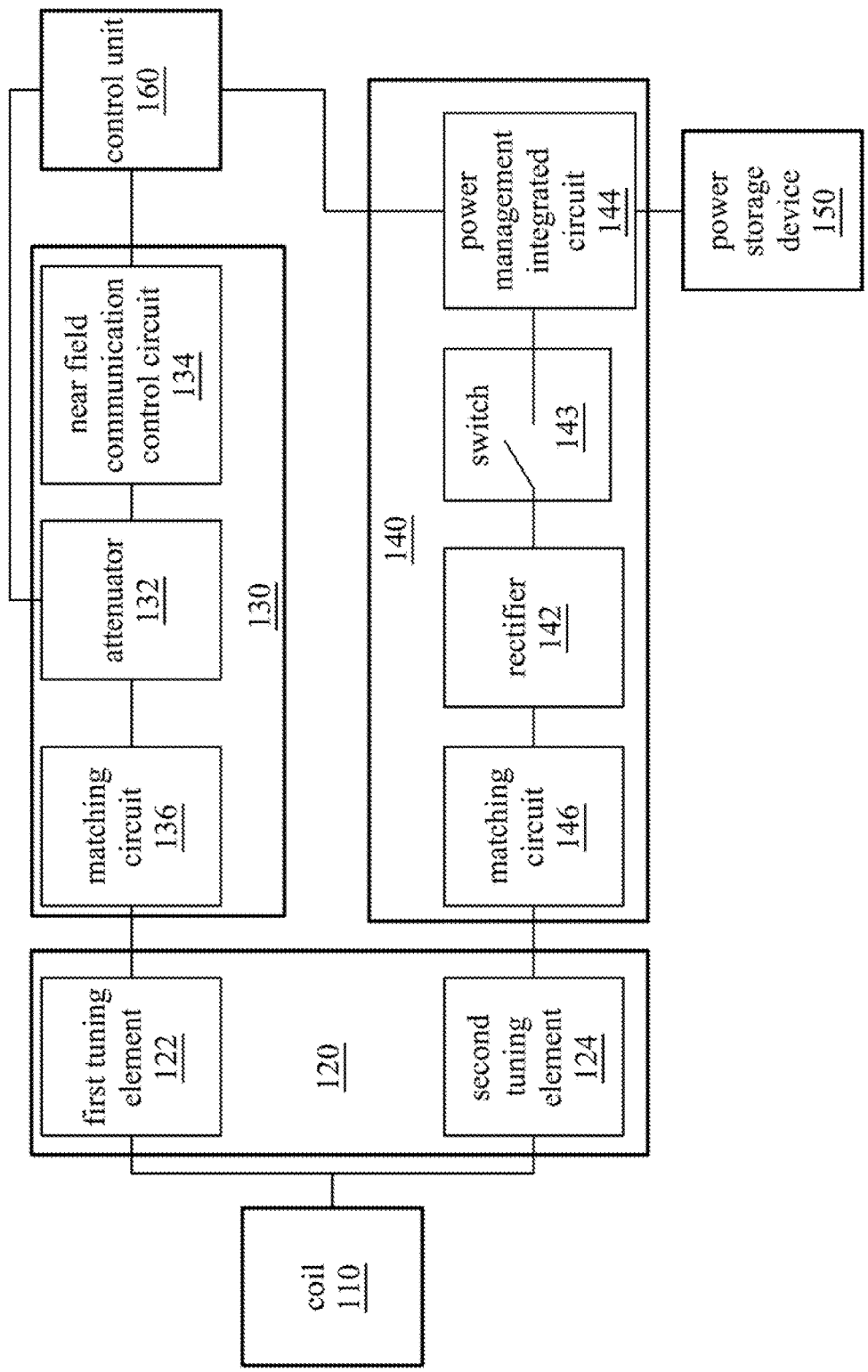
FIG. 1 is a function block diagram of a near field communication and wireless charging device according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a function block diagram of a near field communication and wireless charging device according to one embodiment of the present invention. The near field communication and wireless charging device may be, for example, a mobile phone, a smart watch, or a handheld device with a communication function. The near field communication and wireless charging device includes a coil 110, a tuning module 120, a near field communication module 130, a wireless charging module 140, a power storage device 150, and may include other elements such as a display element, a central processor, and a touch input element (not shown). The coil 110 is configured to receive electromagnetic waves. The tuning module 120, for example, is composed of capacitors, is electrically connected to the coil 110. The near field communication module 130 includes an attenuator 132 and a near field communication control circuit 134. The attenuator 132 is configured to attenuate the energy of the electromagnetic waves transmitted from the tuning module 120. The near field communication control circuit 134 is electrically connected to the attenuator 132. The power storage device 150 is electrically connected to the wireless charging module 140. The electromagnetic waves are capable of magnetically coupling to the coil 110, such that the coil 110 transmits signals of the electromagnetic waves to the near field communication module 130 through the tuning module 120, or transmits the energy of the electromagnetic waves to the power storage device 150 through the tuning module 120 and the wireless charging module 140. It is understandable that in this embodiment, the near field communication module 130 and the wireless charging module 140 share two terminals of the coil 110.

Briefly, the near field communication and wireless charging device of the present embodiment can achieve the near field communication function and the wireless charging function with the single coil 110, thereby reducing the total thickness of the near field communication and wireless charging device and simplifying the designs. More specifically, since both of near field communication and wireless charging need the coil 110 as an antenna to magnetically couple to electromagnetic waves, the near field communication and wireless charging device of the present embodiment can use the same coil 110, and the tuning module 120 can change the coupling frequency of the coil 110. According to different coupling frequency, the electromagnetic waves can be transmitted to the near field communication module 130 or the wireless charging module 140. If the signals of the electromagnetic waves are transmitted to the near field communication module 130 through the coil 110 and the tuning module 120, the attenuator 132 of the near field communication module 130 can attenuate the energy of the electromagnetic waves, i.e., reduce the quality factor of magnetically coupling, to prevent the energy of the electromagnetic waves from saturation, where the saturation makes signal distortions. The attenuated signals can be transmitted to the near field communication control circuit 134 to do signal processing of the near field communication.

In this embodiment, the tuning module 120 includes a first tuning element 122 and a second tuning element 124. The first tuning element 122 is electrically connected to the near field communication module 130 and the coil 110. The second tuning element 124 is electrically connected to the wireless charging module 140 and the coil 110. The capacitance of the first tuning element 122 is smaller than that of the second tuning element 124. In greater detail, both of the first tuning element 122 and the second tuning element 124 can be capacitors. A first coupling frequency can be performed by the first tuning element 122 and the coil 110, and a second coupling frequency which is different from the first coupling frequency can be performed by the second tuning element 124 and the coil 110. Therefore, when the operation frequency of the electromagnetic waves is the first coupling frequency, the electromagnetic waves can be transmitted to the near field communication module 130; when the operation frequency of the electromagnetic waves is the second coupling frequency, the electromagnetic waves can be transmitted to the wireless charging module 140. Since the capacitance of the first tuning element 122 is smaller than that of the second tuning element 124, the first coupling frequency is higher than the second coupling frequency.

For example, the first coupling frequency is 13.56 MHz, and the second coupling frequency is 6.78 MHz, which is the magnetic resonance frequency instituted by Alliance for Wireless Power (A4WP). If the operation frequency of the electromagnetic waves is about 13.56 MHz, the electromagnetic waves can be magnetically coupled to the coil 110 and the first tuning element 122, such that the electromagnetic waves can be transmitted to the near field communication module 130 through the first tuning element 122. If the operation frequency of the electromagnetic waves is about 6.78 MHz, the electromagnetic waves can be magnetically coupled to the coil 110 and the second tuning element 124, such that the electromagnetic waves can be transmitted to the wireless charging module 140 through the second tuning element 124. Therefore, with the combination of the coil 110 and the tuning module 120, the near field communication and wireless charging device of the present embodiment can achieve near field communication function and wireless charging function. Moreover, it is worth to know that in this embodiment, since the first coupling frequency is the harmonic frequency of the second coupling frequency, the coil 110 can transceive both of the first coupling frequency and the second coupling frequency as long as the coil 110 has an effective electrical length that can transceive the second coupling frequency.

In this embodiment, the wireless charging module 140 includes a rectifier 142 and a power management integrated circuit 144. The rectifier 142 is configured to rectify the electromagnetic waves into a direct current. The power management integrated circuit 144 is configured to transmit the direct current to the power storage device 150 and manage power transfer of the power storage device 150. In greater detail, when the coupling frequency of the coil 110 is the second coupling frequency, the induced current generated by the coil 110 can be transmitted to the rectifier 142, which rectifies the induced current into the direct current. Subsequently, the power management integrated circuit 144 transmits the direct current to the power storage device 150 to thereby complete the charging process of the wireless charging module 140. It is noted that when the near field communication and wireless charging device needs the power, the power management integrated circuit 144 may transfer the power from the power storage device 150 to other elements. The power management integrated circuit 144 functions to manage the power transfer of the power storage device 150 and prevent overcharging. However, in other embodiments, before the direct current is transmitted to the power storage device 150 output by the power management integrated circuit 144, the direct current may be first stored in a temporary power storage device (not shown). The power in the temporary power storage device may then be transmitted to the power storage device 150 in response to receiving instructions from the power management integrated circuit 144 to thereby complete the charging process. The temporary power storage device may be disposed inside or outside of the wireless charging module 140, and the temporary power storage device is electrically connected between the power management integrated circuit 144 and the power storage device 150.

Moreover, in this embodiment, the wireless charging module 140 further includes a switch 143 electrically connected to the rectifier 142 and the power management integrated circuit 144. The switch 143 has a power threshold. When a power of the direct current is higher than the power threshold, the rectifier 142 and the power management integrated circuit 144 are electrically connected, and when the power of the direct current is lower than the power threshold, the switch 143 is open. In general, the power threshold can be set to over the peak of the near field communication signal, thereby preventing the energy of the electromagnetic waves from leaking to the power storage device 150 when the wireless charging mode is off. Moreover, when the wireless charging mode is proceed, the power of the direct current is higher than the power threshold of the switch 143, such that the rectifier 142 and the power management integrated circuit 144 are electrically connected, and the energy of the electromagnetic waves can be transmitted to the power storage device 150. In one or more embodiments, the switch 143 may be a single pole single throw (SPST) switch, and the claimed scope of the present invention is not limited in this respect.

In this embodiment, the wireless charging module 140 can further include a matching circuit 146 configured to match the impedance between the coil 110 and a transmission source (not shown), wherein the transmission source is configured to provide electromagnetic waves of the wireless charging. Hence, when the transmission source transmits the electromagnetic waves to the coil 110, the matching circuit 146 can match the impedance between the transmission source and the coil 110, also can fine tune the second coupling frequency. Therefore, the electromagnetic waves and the coil 110 have better magnetically coupling, benefiting energy receiving of the wireless charging module 140.

Moreover, the near field communication module 130 can further include a matching circuit 136 configured to match the impedance between the coil 110 and another transmission source (not shown), wherein the transmission source is configured to provide electromagnetic waves of the near field communication. Hence, when the transmission source transmits the electromagnetic waves to the coil 110, the matching circuit 136 can match the impedance between the transmission source and the coil 110, also can fine tune the first coupling frequency. Therefore, the electromagnetic waves and the coil 110 have better magnetically coupling, benefiting the energy receiving of the near field communication module 130. It is noted that although in this embodiment, the matching circuit 136 is electrically connected to the first tuning element 122 and the attenuator 132, the matching circuit 136 can be electrically connected to the attenuator 132 and the near field communication control circuit 134 in other embodiment, and the claimed scope is not limited in this respect.

In one or more embodiments, the near field communication and wireless charging device can further includes a control unit 160 electrically connected to the power management integrated circuit 144 and the near field communication control circuit 134. The control unit 160, a central processing unit for example, can process the information of the near field communication module 130 and the wireless charging module 140, and can integrate the near field communication module 130 and the wireless charging module 140. For example, the processed information of the near field communication module 130 can be transmitted to the control unit 160 to proceed corresponding procedures. Moreover, when the near field communication and wireless charging device is placed in a specific environment and is desired to proceed wireless charging function with mobile payment, the near field communication and wireless charging device can first near field communicate with a near field communication source of the wireless charging source to process payment or identity checking, and then the near field communication module 130 transmits the payment or identity information to the control unit 160. The control unit 160 can actuate the power management integrated circuit 144 to receive the electromagnetic waves of the wireless charging source to proceed wireless charging.

In other embodiments, the control unit 160 can be electrically connected to the attenuator 132 to adjust the attenuating level of the energy of the electromagnetic waves. For example, the control unit 160 can determine the attenuating level of the attenuator 132 according to the signal intensity received by the near field communication control circuit 134, and the claimed scope is not limited in this respect. In other words, the attenuator 132 is a tunable attenuator which is composed by a single circuit or multiple tunable elements.

Figure 2:
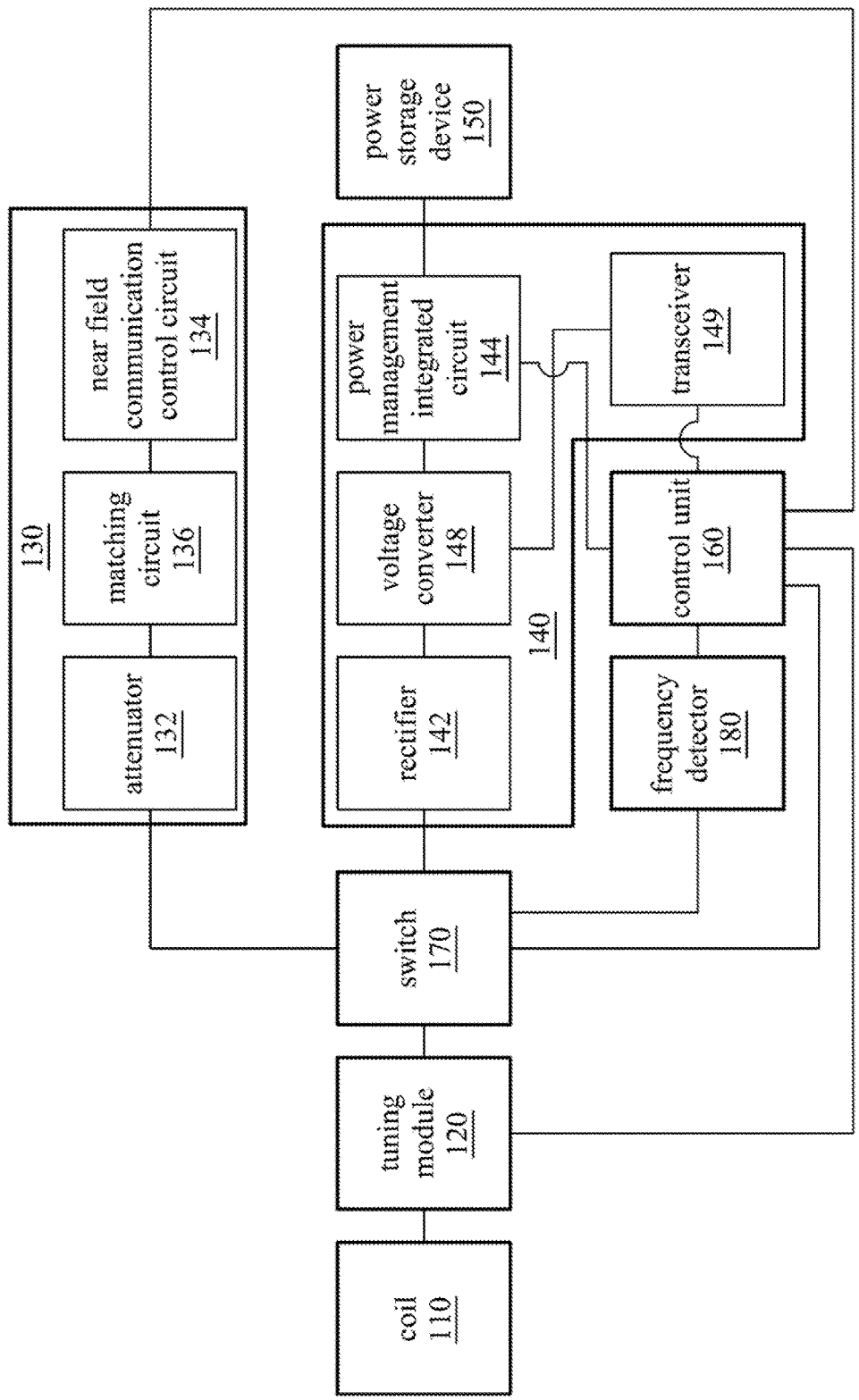
FIG. 2 is a function block diagram of a near field communication and wireless charging device according to another embodiment of the present invention.

FIG. 2 is a function block diagram of a near field communication and wireless charging device according to another embodiment of the present invention. Since some elements are the same as the elements shown in FIG. 1, the marks thereof are followed those in FIG. 1. In this embodiment, the near field communication and wireless charging device further includes a switch 170 and a frequency detector 180. The switch 170 is electrically connected to the tunable module 120, the near field communication module 130, the wireless charging module 140, and the frequency detector 180. The frequency detector 180 is configured to detect an operation frequency of the electromagnetic waves. The control unit 160 is electrically connected to the frequency detector 180 and the switch 170 and is configured to receive the operation frequency detected by the frequency detector 180. The control unit 160 controls the switch 170 to selectively interconnect the tuning module 120 and the near field communication module 130 or interconnect the tuning module 120 and the wireless charging module 140 according the operation frequency. The control unit 160 is further electrically connected to a transceiver 149.

Figure 3:
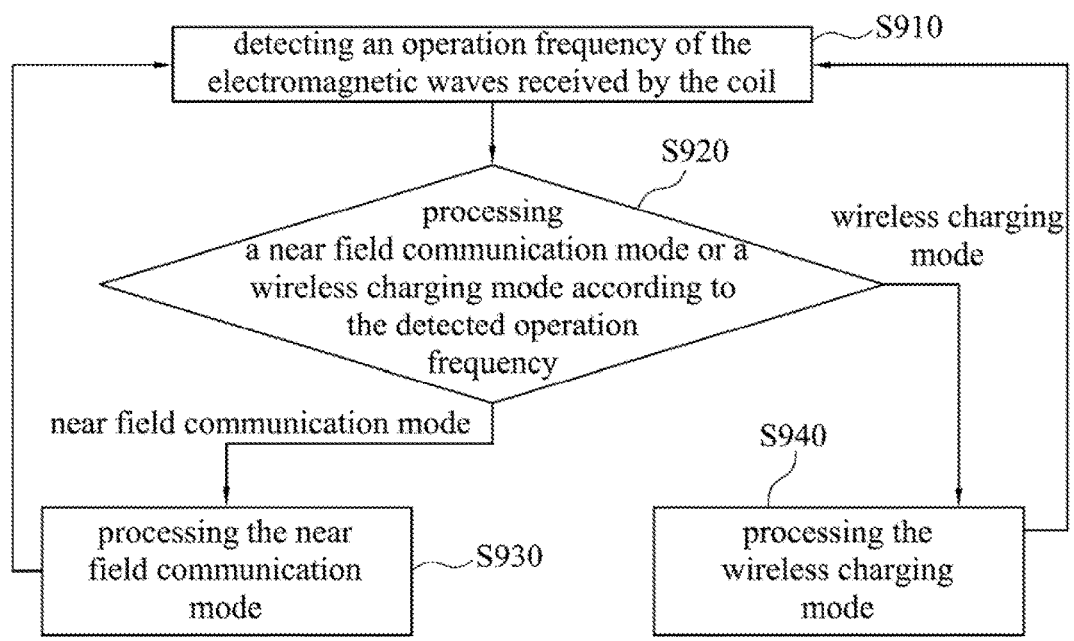
FIG. 3 is a flowchart of a switch method of the near field' communication and wireless charging device according to one embodiment of the present invention.

Reference is made to FIGS. 2 and 3. FIG. 3 is a flowchart of a switch method of the near field communication and wireless charging device according to one embodiment of the present invention. The near field communication and wireless charging device of FIG. 2 is provided by way of example herein. In operation, detecting an operation frequency of the electromagnetic waves received by the coil 110, as shown in step S910. In greater detail, the default of the switch 170 is switched to the frequency detector 180. The tuning module 120 and the frequency detector 180 are interconnected based on the operation frequency of the electromagnetic waves detected by the frequency detector 180. At this state, the paths between the tuning module 120 and the near field communication module 130, and between the tuning module 120 and the wireless charging module 140 are open. Therefore, the electromagnetic waves received by the coil 110 can be transmitted to the frequency detector 180 through the switch 170, which then transmits the detected result to the control unit 160 to be analyzed.

Subsequently, as shown in step S920, the state of the switch 170 is changed according to the detected operation frequency to decide whether to proceed a near field communication mode or a wireless charging mode. In greater detail, the control unit 160 can first determine the detected frequency value. If the frequency value is 13.56 MHz, the near field communication mode is selected, as shown in step S930. The control unit 160 controls the switch 170 to switch to the near field communication module 130, thereby the electromagnetic waves can be transmitted to the near field communication module 130 through the switch 170. After the attenuator 132 attenuates the energy of the electromagnetic waves, the near field communication control circuit 134 processes the data of the electromagnetic waves. Once the mode, no matter the near field communication mode or the wireless charging mode, is proceeded, the switch 170 is switched to connect to the frequency detector 180 again.

On the other hand, the procedure is back to step S920. If the frequency value is 6.78 MHz, the wireless charging mode is selected, as shown in step S940. The control unit 160 controls the switch 170 to switch to the wireless charging module 140, thereby the electromagnetic waves can be transmitted to the wireless charging module 140 through the switch 170, and the energy thereof can be transmitted to the power storage device 150. Therefore, the near field communication mode or the wireless charging mode can be selected based on the detected operation frequency of electromagnetic waves. Users are not necessary to manually set whether the near field communication mode or the wireless charging mode should be. Therefore, it greatly improves the utilization convenience of the near field communication and wireless charging device.

Reference is made to FIG. 2. In this embodiment, the tuning module 120 is a tunable capacitor, and the control unit 160 is further electrically connected to the tuning module 120. Hence, once the control unit 160 selects the near field communication mode or the wireless charging mode, the control unit 160 can dynamically adjust the capacitance of the tuning module 120 to change the coupling frequency of the coil 110, thereby enhancing the magnetically coupling between the coil 110 and the electromagnetic waves. The tunable capacitor can be a single circuit or combined by multiple tunable elements such as capacitors and/or inductors.

In this embodiment, the wireless charging module 140 further includes a voltage converter 148 electrically connected to the rectifier 142 and the power management integrated circuit 144 for adjusting the voltage of the direct current. In some embodiments, if the voltage of the direct current rectified by the rectifier 142 is not match the voltage required by the power storage device 150, the direct current may damage the power storage device 150 when it is feed into the power storage device 150. The voltage converter 148 can adjust the voltage of the direct current into the voltage required by the power storage device 150. The direct current then feeds the power management integrated circuit 144, and the energy thereof can be stored in the power storage device 150. Moreover, it is noted that since in this embodiment, the path between the tuning module 120 and the wireless charging module 140 is open when the near field communication and wireless charging device is in the near field communication mode, the switch 143 (see FIG. 1) can be omitted in the wireless charging module 140.

Based on the operation of the control unit 160, in this embodiment, the wireless charging module 140 can further include a transmitting transceiver 149 electrically connected to the voltage converter 148. The transmitting transceiver 149 is configured to communicate with a transmission source to decide whether to actuate the voltage converter 148 according to a transmission result between the transmitting transceiver 149 and the transmission source. If the transmission protocol therebetween is matched, the voltage converter 148 is actuated and then the charging is achieved. The transmitting transceiver 149 can be a bluetooth device, and the claimed scope is not limited in this respect.

Figure 4:
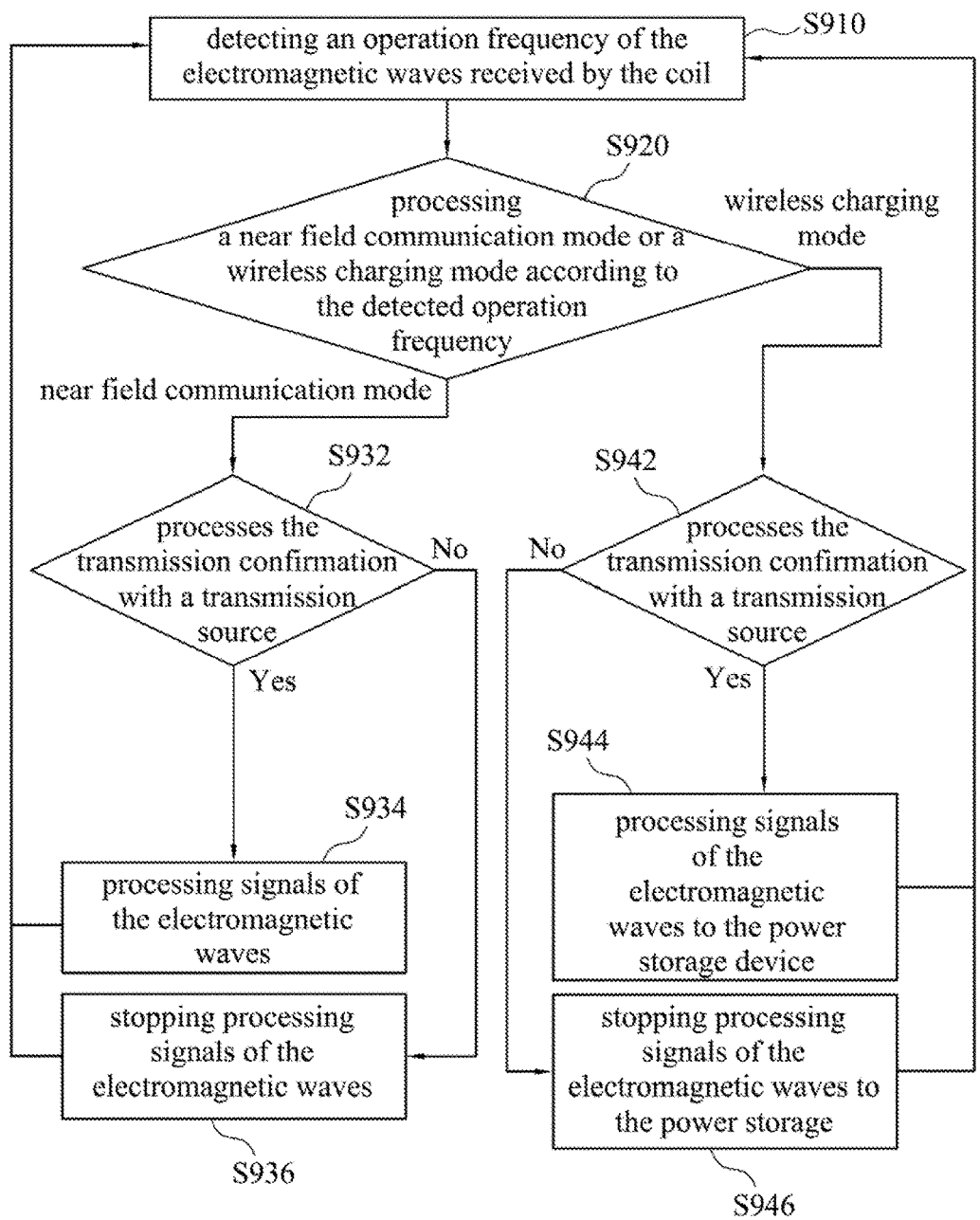
FIG. 4 is a flowchart of a switch method of the near field communication and wireless charging device according to another embodiment of the present invention.

Reference is made to FIGS. 2 and 4. FIG. 4 is a flowchart of a switch method of the near field communication and wireless charging device according to another embodiment of the present invention. Since some operations are the same as that in FIG. 3, the marks thereof are followed those in FIG. 3. In operation, processing a transmission confirmation with the transmission source which is a wireless charging source, as shown in step S942. In greater detail, when the frequency detector 180 detects the operation frequency (such as 6.78 MHz) of the wireless charging electromagnetic waves, the control unit 160 switches the switch 170 to interconnect the tuning module 120 and the wireless charging module 140. Subsequently, the transmitting transceiver 149 starts to communicate with the wireless charging source to confirm whether the electromagnetic waves detected by the frequency detector 180 is provided by the wireless charging source and is not provided by the noise signals with similar frequency in the air. If the transmission confirmation is positive, processing signals of the electromagnetic waves is feed into the power storage device 150, as shown in step S944. For example, the transmitting transceiver 149 can actuate the voltage converter 148 to allow the energy of the electromagnetic waves transmitted to the power storage device 150 through the voltage converter 148. If the transmission confirmation is negative, stopping feeding the energy of the electromagnetic waves to the power storage device 150, as shown in step S946. For example, the transmitting transceiver 149 stops actuating the voltage converter 148 so as to make an open path between the rectifier 142 and the power management integrated circuit 144. This way, the near field communication and wireless charging device can prevent the power storage device 150 from being charged by other unknown electromagnetic waves.

On the other hand, the transmission protocol confirmation can be included in the near field communication mode. Reference is made to FIGS. 2 and 4. As shown in step S932, another transmitting transceiver (not shown) proceeds the transmission confirmation with another transmission source which is a near field communication source. In greater detail, when the frequency detector 180 detects the operation frequency (such as 13.56 MHz) of the near field communication electromagnetic waves, the control unit 160 switches the switch 170 to interconnect the tuning module 120 and the near field communication module 130. Subsequently, the near field communication control circuit 134 starts to communicate with the near field communication source for transfer protocol to confirm whether the electromagnetic waves detected by the frequency detector 180 is provided by the near field communication source. Taking a mobile payment as an example, the near field control circuit 134 can include a secure element which can communicate with the near field communication source to confirm the transfer protocol and identity, such as confirming whether the secure element place to process the payments. If the transmission confirmation is positive, processing signals of the electromagnetic waves, as shown in step S934. For example, the near field communication control circuit 134 starts to receive the signals of the electromagnetic waves. If the transmission confirmation is negative, stopping processing the signals of the electromagnetic waves, as shown in step S936. For example, the near field communication control circuit 134 stops receiving the signals of the electromagnetic waves. This way, the near field communication and wireless charging device can prevent the near field communication control circuit 134 from receiving signals of unknown electromagnetic waves. As mentioned above, once the procedure, whether the energy transmission of the electromagnetic waves or the information procession of the electromagnetic waves, is finished, the switch 170 is switched to connect to the frequency detector 180 again.

Figure 5A:
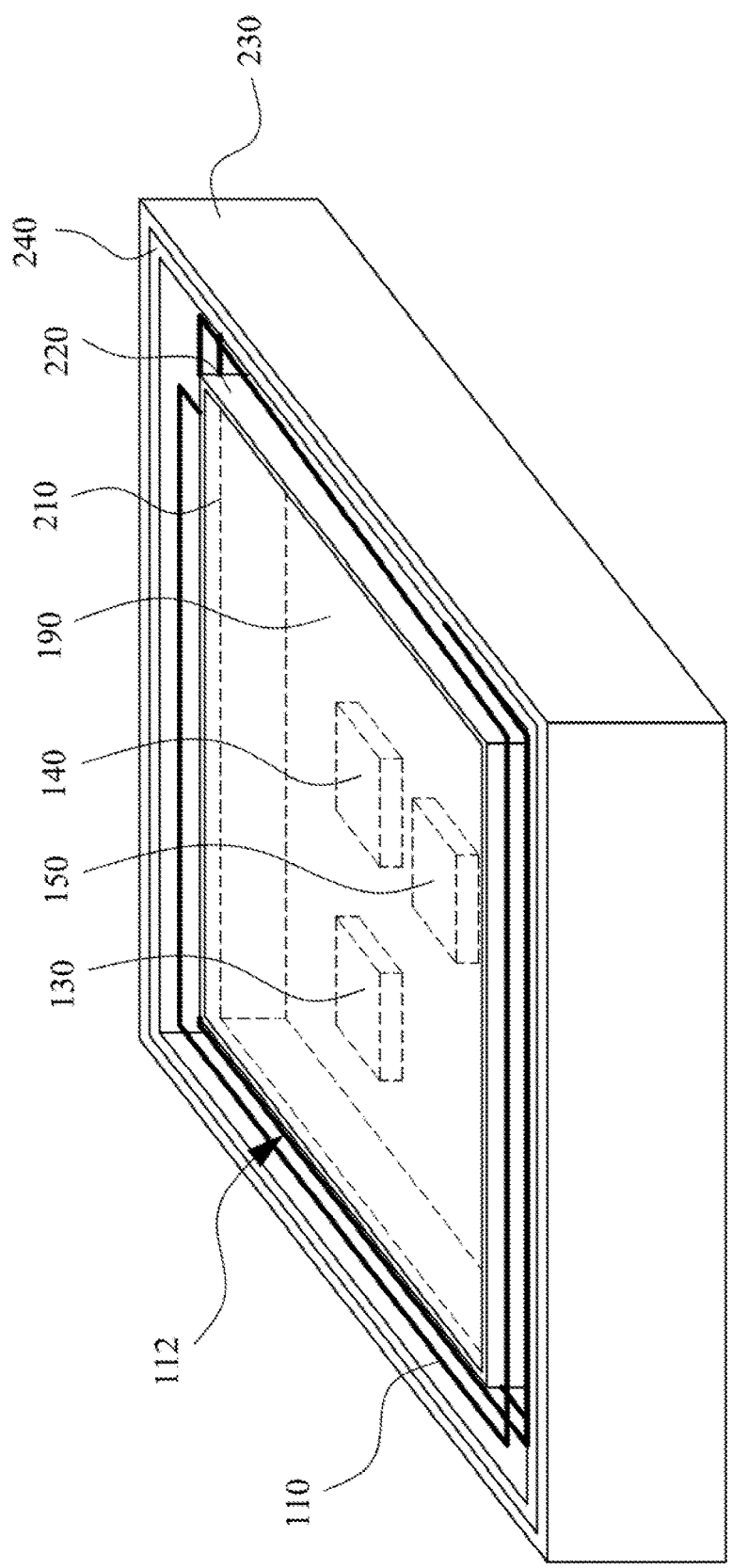
FIG. 5A is a three dimensional diagram of the near field communication and wireless charging device according to one embodiment of the present invention.
Figure 5B:
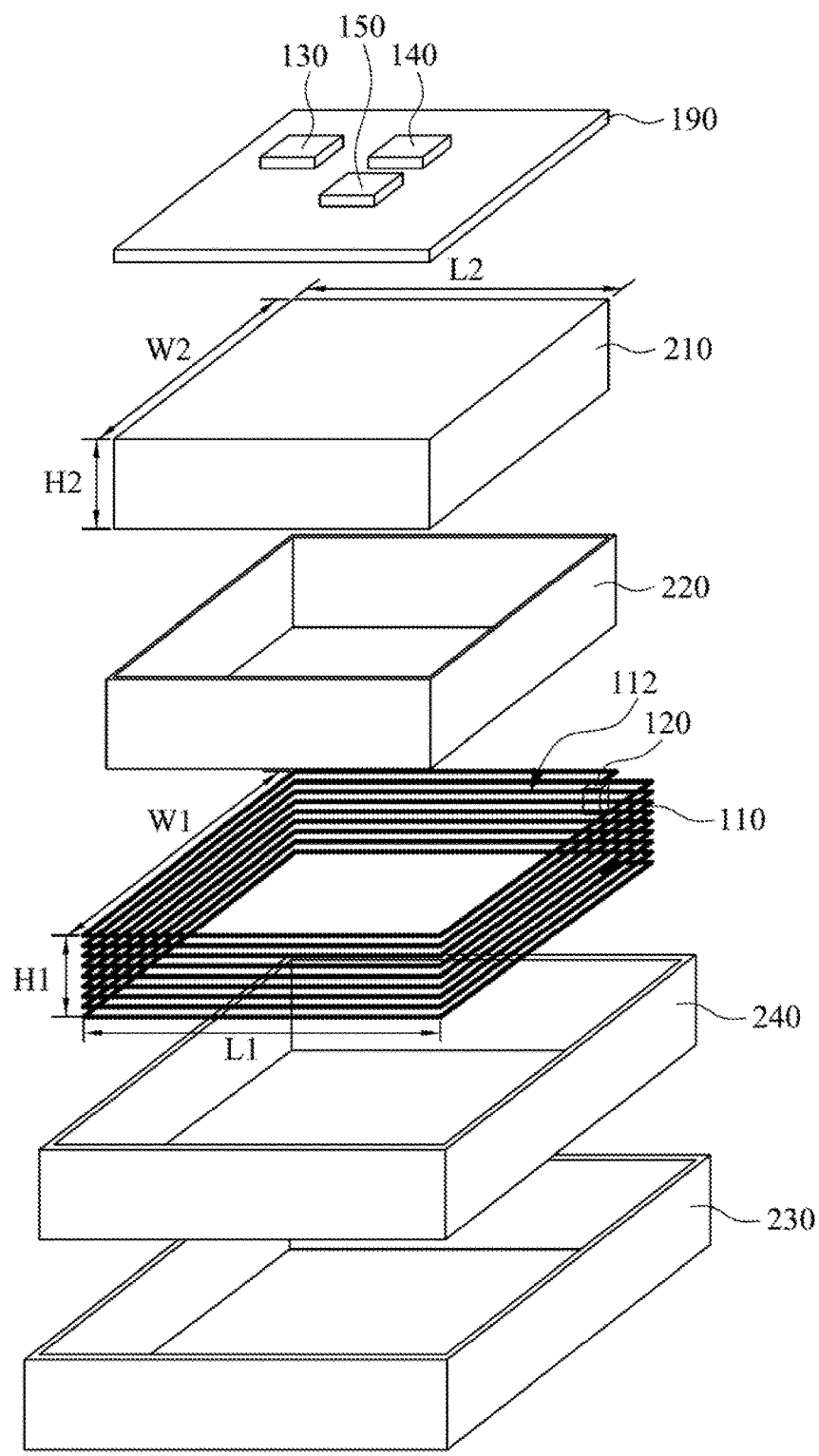
FIG. 5B is an exploded diagram of the near field communication and wireless charging device of FIG. 5A.

FIG. 5A is a three dimensional diagram of the near field communication and wireless charging device according to one embodiment of the present invention, and FIG. 5B is an exploded diagram of the near field communication and wireless charging device of FIG. 5A. In this embodiment, the coil 110, such as a loop with two terminals, defines a through hole 112 by a looped configuration. The near field communication module 130, the wireless charging module 140 and the power storage device 150 form a metal area 210 disposed in the through hole 112. For example, the near field communication module 130, the wireless charging module 140, and the power storage device 150 can be disposed on a circuit board 190 which further includes other electronic elements, and the claimed scope of the present invention is not limited in this respect. More specifically, since the space inside the through hole 112 of the coil 110 can be utilized, the coil 110 itself does not increase the whole volume of the near field communication and wireless charging device, facilitating device miniaturization and compactness. Moreover, one of the terminals of the coil 110 can be connected to the tuning module 120 and then the circuit board 190 while the other terminal can be connected to the circuit board 190. The elements of the near field communication and wireless charging device shown in FIGS. 1 and 2 can be disposed in the through hole 112.

In one or more embodiments, the near field communication and wireless charging device can further include other electronic element disposed on the circuit board 190 and occupy a specific area to form a specific volume. It is understood that the electronic elements would make some effect of radiation efficiency and some electromagnetic interference to the coil 110. In this embodiment, due to simulation requirements and explanation simplification of features of the present embodiment, the effect of the electronic elements to the coil 110 is equivalent to that of the metal area 210 to the coil 110, where the metal area 210 includes the near field communication module 130, the wireless charging module 140, the power storage device 150, and other electronic elements. Moreover, the near field communication and wireless charging device can further include a first shielding layer 220 disposed between the metal area 210 and the coil 110. The first shielding layer 220 can block the electromagnetic interference of the metal area 210 against the coil 110, increasing the receiving distance of the coil 110 under the near field communication mode. The first shielding layer 220 can be made of ferrite material, and the claimed scope is not limited in this respect.

In one or more embodiments, the near field communication and wireless charging device can further include a housing 230 disposed around the coil 110, which improves artistic of the near field communication and wireless charging device. Moreover, the near field communication and wireless charging device can further include a second shielding layer 240 disposed between the housing 230 and the coil 110, and the material thereof can be the same as that of the first shielding layer 220. When the housing 230 is made by conductive material, the first shielding layer 220 or the second shielding layer 240 can be a carrier of the coil 110. When the housing 230 is not made by conductive material, the first shielding layer 220 or the housing 230 can be the carrier of the coil 110.

The following paragraphs provide detailed explanations with respect to the effect of the metal area 210, the housing 230, the first shielding layer 220, and the second shielding layer 240 to the near field communication mode of the near field communication and wireless charging device. In this example, the coil 110 had a length L1=37 mm, a width W1=43 mm, and a height H1=5 mm, and the metal area 210 had a length L2, a width W2, and a height H2. The following are four sizes of the metal area 210:

Sample 1: L2=30 mm, W2=30 mm, H2=5 mm.
Sample 2: L2=30 mm, W2=30 mm, H2=10 mm.
Sample 3: L2=30 mm, W2=40 mm, H2=5 mm.
Sample 4: L2=34 mm, W2=40 mm, H2=5 mm.

TABLE 1 near field communication parameters of the near field communication and wireless charging device without any shielding layer between the metal area 210 and the coil 110

|  | Sample 1 | Sample 2 | Sample 3 | Sample 4 |
| --- | --- | --- | --- | --- |
| First tuning element | 80 pF | 80 pF | 85 pF | 115 pF |
| Distance of near field communication | 22 mm | 20 mm | 18 mm | 17 mm |

TABLE 2 near field communication parameters of the near field communication and wireless charging device with shielding layer(s) between the metal area 210 and the coil 110

|  | Sample 1 | Sample 2 | Sample 3 | Sample 4 |
| --- | --- | --- | --- | --- |
| First tuning element | 40 pF | 40 pF | 40 pF | 40 pF |
| Distance of near field communication | 28 mm | 27 mm | 27 mm | 26 mm |

TABLE 3 near field communication parameters of the near field communication and wireless charging device with shielding layers between the metal area 210 and the coil 110 and between the coil 110 and the housing 230

|  | Sample 1 | Sample 2 | Sample 3 | Sample 4 |
| --- | --- | --- | --- | --- |
| First tuning element | 35 pF | 35 pF | 35 pF | 35 pF |
| Distance of near field communication | 20 mm | 18 mm | 17 mm | 16 mm |

The near field communication and wireless charging devices of Table 1 did not include the housing 230, the first shielding layer 220 and the second shielding layer 240. The near field communication and wireless charging devices of Table 2 did not include the housing 230 and the second shielding layer 240. The near field communication and wireless charging devices of Table 3 included the metal area 210, the housing 230 (made by conductive material), the first shielding layer 220, and the second shielding layer 240. According to Table 1 to Table 3, although the near field communication and wireless charging devices with the metal area 210 included the first tuning element 122 (see FIG. 1) with higher capacitance and works on shorter distance of near field communication, these values were acceptable. With adding the first shielding layer 220, the capacitance of the first tuning element 122 of the near field communication and wireless charging devices with the metal area 210 was greatly reduced, and the distance of the near field communication was greatly improved. Furthermore, with adding the housing 230 and the second shielding layer 240, both of the capacitance of the first tuning element 122 and the working distance of the near field communication were acceptable.

In summary, although the near field communication of the near field communication and wireless charging devices was affected by the other electronic elements, e the metal area 210. However, the first shielding layer 220 could reduce the effect of the metal area 210 to the coil 110. Furthermore, both of the capacitance of the first tuning element 122 and the working distance of the near field communication were acceptable when the metal-made housing 230 and the second shielding layer 240 are included. In other words, in the case of beautifying the appearance, the near field communication and wireless charging device could still meet the near field communication capabilities.

Figure 6:
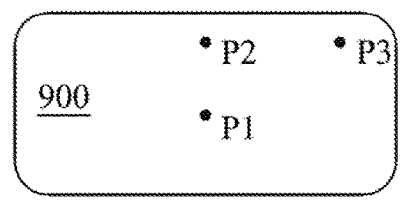
FIG. 6 is a top view of a wireless charging source.

The following paragraphs provide experiment results with respect to the effect of the metal area 210 to the wireless charging mode of the near field communication and wireless charging device. FIG. 6 is a top view of a wireless charging source 900. In this example, the coil had a length L1=37 mm, a width W1=43 mm, and a height H1=5 mm, and the metal area 210 had a length L2=30 mm, a width W2=30 mm, and a height H2=5 mm. The near field communication and wireless charging device could be charged when it was placed at different positions P1, P2, and P3 of the wireless charging source 900. The wireless charging source 900 was a charging mat of class 3 of Alliance for Wireless Power (A4WP).

TABLE 4 wireless charging parameters of the near field communication and wireless charging device without the metal area 210

|  | P1 | | P2 | | P3 | |
| --- | --- | --- | --- | --- | --- | --- |
| Loading | Voltage | Current | Voltage | Current | Voltage | Current |
| 20 Ω | 4.86 V | 0.247 A | 4.87 V | 0.248 A | 4.85 V | 0.248 A |
| 5 Ω | 3.62 V | 0.697 A | 3.86 V | 0.737 A | 3.87 V | 0.738 A |

TABLE 5 wireless charging parameters of the near field communication and wireless charging device with the metal area 210

|  | P1 | | P2 | | P3 | |
| --- | --- | --- | --- | --- | --- | --- |
| Loading | Voltage | Current | Voltage | Current | Voltage | Current |
| 20 Ω | 4.87 V | 0.247 A | 3.80 V | 0.193 A | 3.80 V | 0.193 A |
| 5 Ω | 3.74 V | 0.753 A | 3.45 V | 0.694 A | 3.54 V | 0.694 A |

The loading of Tables 4 and 5 were the loading of the near field communication and wireless charging device. According to Tables 4 and 5, there was no significant different between the charging powers (P=I*V) of the near field communication and wireless charging devices with and/or without the metal area 210, where the charging power of the near field communication and wireless charging device with the metal area 210 could reach to 0.7 W~2.8 W. In other words, the electronic elements inside the near field communication and wireless charging device did not significantly affect the wireless charging function.

Figure 7A:
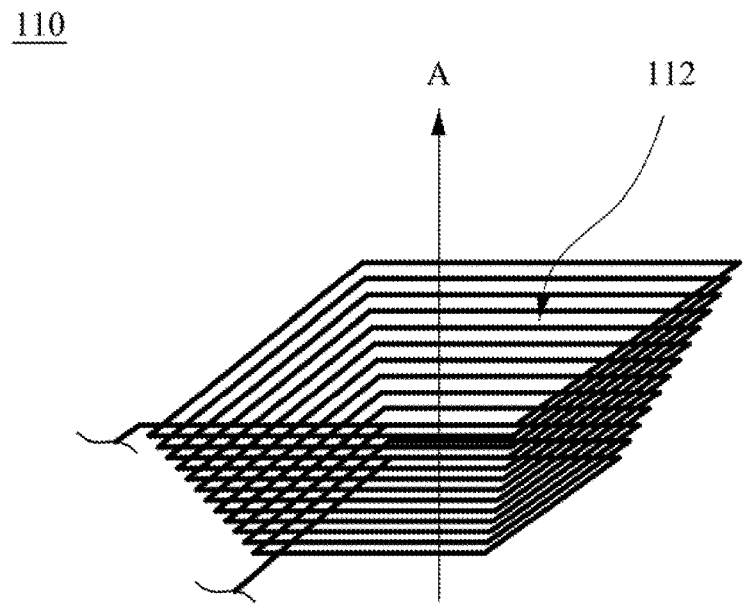
FIGS. 7A and 7B are three-dimensional views of coils according to another two embodiment of the present invention.
Figure 7B:
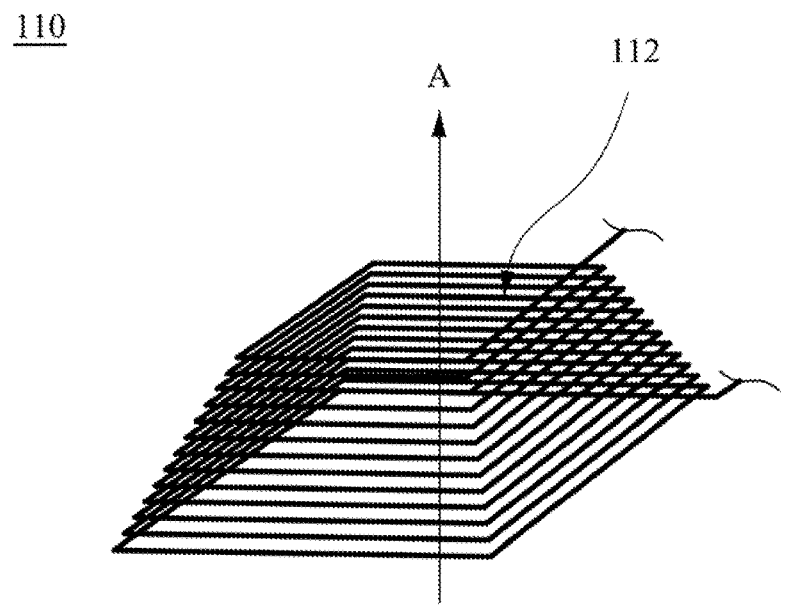

FIGS. 7A and 7B are three-dimensional views of coils 110 according to another two embodiments of the present invention. The difference of these two embodiments and that of FIG. 5B pertains to the shape of the coils 110. In these two embodiments, the cross-sectional areas of the through hole 112 change along the axis A of the through hole 112. In FIG. 7A, the cross-sectional area of the through hole 112 gets larger along the axis A of the through hole 112, and in FIG. 7B, the cross-sectional area of the through hole 112 gets smaller along the axis A of the through hole 112, and the claimed scope is not limited in this respect. Basically, the shape of the coil 110 can adapted to the occupying volume of the metal area 210. Therefore, the cross-sectional area of the through hole 112 can be circle, square, or polygon, and the through hole 112 can be cylindrical-shaped, stand-platform-shaped, cone-shaped, or any other suitable shapes.

Figure 8:
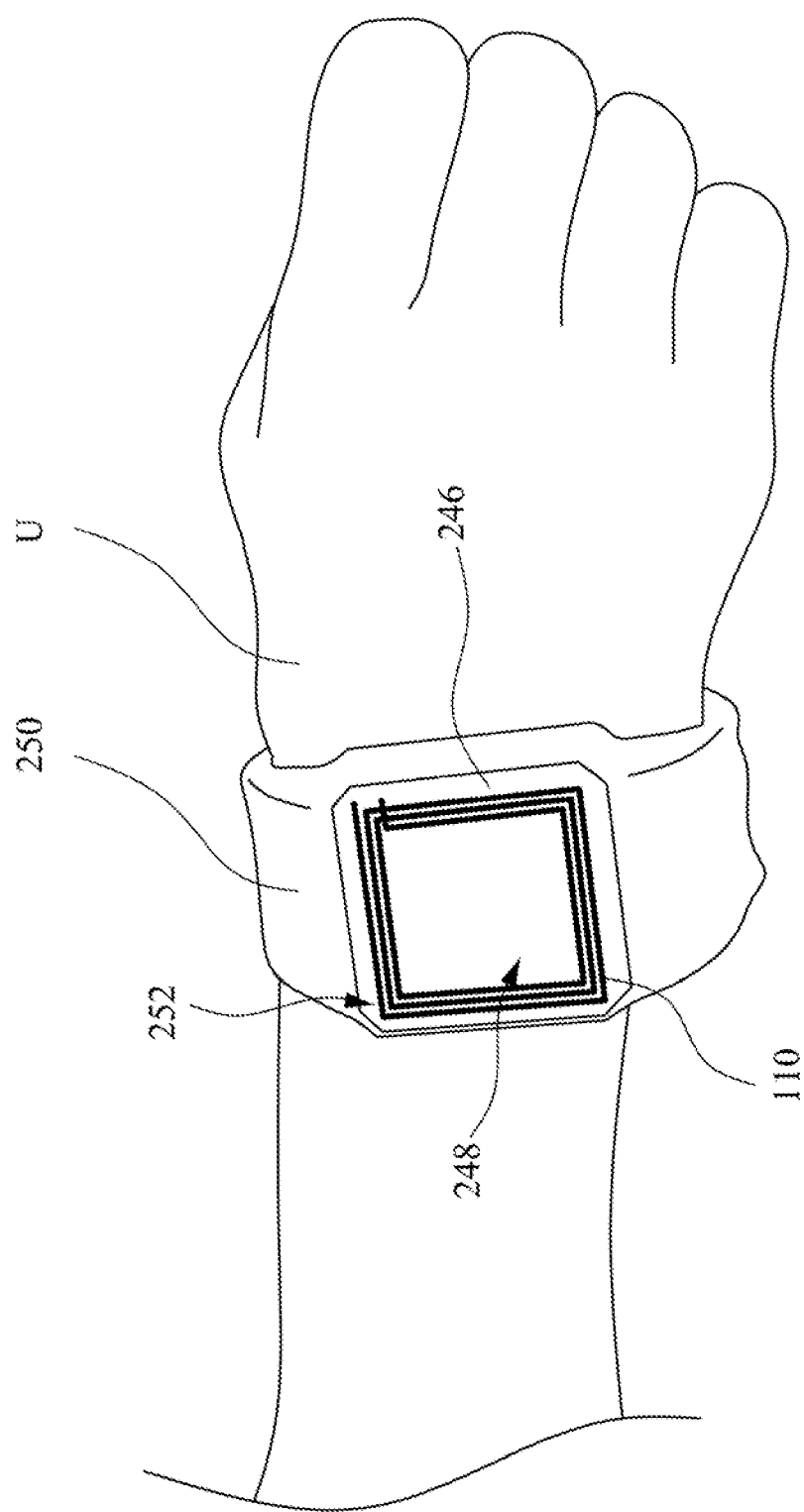
FIG. 8 is a schematic diagram of a near field communication and wireless charging device and a user according to another embodiment of the present invention.

FIG. 8 is a schematic diagram of a near field communication and wireless charging device and a user U according to another embodiment of the present invention. The difference of this embodiment and that of FIG. 5A pertains to the arrangement and the shape of the coil 110, and the presence of a wearable structure 250. In this embodiment, the near field communication and wireless charging device can further include the wearable structure 250, such that the user U can wear the near field communication and wireless charging device via the wearable structure 250. The coil 110 is disposed at a surface 252 of a body 246 of the near field communication and wireless charging device to be away from the user U. More specifically, in this embodiment, the near field communication and wireless charging device can be a wrist-wearing communication device, and the wearable structure 250 can be the wrist strap thereof. The body 246 and the wearable structure 250 can be integrated formed or be separated from each other. Since the coil 110 is disposed at the surface 252 the surface 252 can approach to a transmission source when the near field communication and wireless charging device is processing the near field communication. There is no need to take off the near field communication and wireless charging device, thereby greatly enhancing the convenience of the near field communication. Furthermore, the coil 110 of the present embodiment is disposed at the surface 252, which means the coil 110 is a two dimensional coil. Under the same operation frequency, the whole thickness of the device is reduced although the coil 110 occupies larger area of the surface 252 that makes the information displaying region 248 of the near field communication and wireless charging device decreased. The other elements such as the tuning module 120, the near field communication module 130, the wireless charging module 140, and the energy storage module 150, of the near field communication and wireless charging device can be disposed under the coil 110, i.e., inside the housing 230 (see FIG. 5B).

Furthermore, reference is made to FIGS. 5B and 8. It is noted that although the embodiment of FIG. 8 takes the near field communication and wireless charging device with the two-dimensional coil as an example, in other embodiments, the near field communication and wireless charging device of FIG. 5B can include the wearable structure 250, allowing the user U to wear the near field communication and wireless charging device via the wearable structure 250. Since the coil 110 of FIG. 5B is a three-dimensional coil, there is no need to occupy the area of the surface 252 under the same operation frequency, thereby increasing the information displaying region 248 of the near field communication and wireless charging device. Since the coil 110 is disposed in the established housing 230, the whole thickness of the device is not increased. Furthermore, there is no need to take off the near field communication and wireless charging device when the near field communication function is processed, thereby greatly enhancing the convenience of the near field communication.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A near field communication and wireless charging device comprising:
 a coil configured to receive electromagnetic waves;
 a tuning module electrically connected to the coil, wherein the tuning module comprises:
  a first tuning element electrically connected to the near field communication module and the coil; and
  a second tuning element electrically connected to the wireless charging module and the coil, wherein a capacitance of the first tuning element is smaller than a capacitance of the second tuning element;
 a near field communication module comprising:
  an attenuator configured to attenuate the energy of the electromagnetic waves transmitted from the tuning module; and
  a near field communication control circuit electrically connected to the attenuator to process near field communication information of the electromagnetic waves attenuated by the attenuator;
 a wireless charging module; and
 a power storage device electrically connected to the wireless charging module,
 wherein the electromagnetic waves are capable of magnetically coupling to the coil, such that the coil transmits signals of the electromagnetic waves to the near field communication module through the tuning module, or transmits the energy of the electromagnetic waves to the power storage device through the tuning module and the wireless charging module.

2. The near field communication and wireless charging device of claim 1, wherein the wireless charging module comprises:
 a rectifier configured to rectify the electromagnetic waves into a direct current; and
 a power management integrated circuit configured to transmit the direct current to the power storage device and manage power transfer of the power storage device.

3. The near field communication and wireless charging device of claim 2, wherein the wireless charging module further comprises:
 a switch electrically connected to the rectifier and the power management integrated circuit, wherein the switch has a power threshold; when a power of the direct current is higher than the power threshold, the rectifier and the power management integrated circuit are electrically connected; and when the power of the direct current is lower than the power threshold, the switch is open.

4. The near field communication and wireless charging device of claim 3, wherein the switch is a single pole single throw switch.

5. The near field communication and wireless charging device of claim 2, wherein the wireless charging module further comprises:
   a voltage converter configured to adjust a voltage of the direct current.

6. The near field communication and wireless charging device of claim 5, wherein the wireless charging module further comprises:
   a transmitting transceiver electrically connected to the voltage converter and configured to communicate with a transmission source to decide whether to actuate the voltage converter according to a transmission result with the transmission source.

7. The near field communication and wireless charging device of claim 1, wherein the wireless charging module comprises:
   a matching circuit configured to match an impedance between the coil and a transmission source.

8. The near field communication and wireless charging device of claim 1, wherein the near field communication module further comprises:
   a matching circuit configured to match an impedance between the coil and a transmission source.

9. The near field communication and wireless charging device of claim 1, wherein the coil defines a through hole by a looped configuration, and the near field communication module, the wireless charging module, and the power storage device form a metal area disposed in the through hole.

10. The near field communication and wireless charging device of claim 9, wherein a cross-sectional area of the through hole changes along an axis of the through hole.

11. The near field communication and wireless charging device of claim 9, further comprising:
    a first shielding layer disposed between the metal area and the coil.

12. The near field communication and wireless charging device of claim 11, further comprising:
    a housing disposed around the coil.

13. The near field communication and wireless charging device of claim 12, wherein when the housing is made by conductive material, the near field communication and wireless charging device further comprising:
    a second shielding layer disposed between the housing and the coil.

14. The near field communication and wireless charging device of claim 11, wherein the first shielding layer is configured to be a carrier of the coil.

15. The near field communication and wireless charging device of claim 12, wherein the housing is configured to be a carrier of the coil.

16. The near field communication and wireless charging device of claim 13, wherein the second shielding layer is configured to be a carrier of the coil.

17. The near field communication and wireless charging device of claim 1, further comprising:
    a wearable structure configured to allow a user to wear the near field communication and wireless charging device, wherein the coil is disposed at a surface of a body of the near field communication and wireless charging device away from the user.

18. A switch method of near field communication and wireless charging comprising:
    detecting an operation frequency of electromagnetic waves received by a coil; and
    selecting to proceed a near field communication mode or a wireless charging mode according to the operating frequency; if selecting the near field communication mode, transmitting the energy of the electromagnetic waves through a first tuning element and attenuating the energy of the electromagnetic waves and then processing information of the electromagnetic waves; and if selecting the wireless charging mode, transmitting the energy of the electromagnetic waves to a power storage device through a second tuning element which has a capacitance greater than a capacitance of the first tuning element.

19. The switch method of claim 18, wherein selecting the near field communication mode comprises:
    processing a transmission confirmation with a transmission source, wherein if the transmission confirmation is positive, processing signals of the electromagnetic waves; and if the transmission confirmation is negative, stopping processing the signals of the electromagnetic waves.

20. The switch method of claim 18, wherein selecting the wireless charging mode comprises:
    processing a transmission confirmation with a transmission source, wherein if the transmission confirmation is positive, transmitting the energy of the electromagnetic waves to the power storage device; and if the transmission confirmation is negative, stopping transmitting the energy of the electromagnetic waves to the power storage device.

* * * * *